(12) United States Patent
Benbrahim et al.

(10) Patent No.: US 12,101,607 B1
(45) Date of Patent: Sep. 24, 2024

(54) SYSTEMS FOR SYNCHRONIZING DATA FROM MULTIPLE DEVICES

(71) Applicant: AMAZON TECHNOLOGIES, INC., Seattle, WA (US)

(72) Inventors: Jamal Benbrahim, San Jose, CA (US); Marko Bundalo, Munich (DE); Aaron Schellenberg, Santa Cruz, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 216 days.

(21) Appl. No.: 17/809,803

(22) Filed: Jun. 29, 2022

(51) Int. Cl.
*H04R 3/00* (2006.01)
*G10L 21/0208* (2013.01)

(52) U.S. Cl.
CPC ............ *H04R 3/00* (2013.01); *G10L 21/0208* (2013.01)

(58) Field of Classification Search
CPC .............................. H04R 3/00; G10L 21/0208
See application file for complete search history.

(56) References Cited

U.S. PATENT DOCUMENTS

2022/0014295 A1* 1/2022 Bonde ................... H04R 5/033

* cited by examiner

*Primary Examiner* — Andrew Sniezek
(74) *Attorney, Agent, or Firm* — Lindauer Law, PLLC

(57) ABSTRACT

A first device in a system produces a first clock signal, while a second device in the system produces a second clock signal. A clock arbitration component of the system determines which of the clock signals to send to a third device in the system, which generates data based on the first clock. This data, along with data from the first device, is used to generate synchronized data, that is synchronized based on the first clock, which is then sent to the second device for performance of a function. At times when the first device is not active and only the second clock signal is received, the second clock signal is sent to the third device, which generates data based on the second clock that is used to generate synchronized data to be sent to the second device.

20 Claims, 5 Drawing Sheets

SYSTEMS FOR SYNCHRONIZING DATA FROM MULTIPLE DEVICES

BACKGROUND

Synchronization of data between devices that operate using different device clocks may enable functions to be performed based on data from different devices. For example, a device that receives audio input at a time when the device is also presenting an audio output may synchronize these inputs and outputs to enable acoustic echo cancellation (AEC) to be performed on frames of data from different devices associated with the same times.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
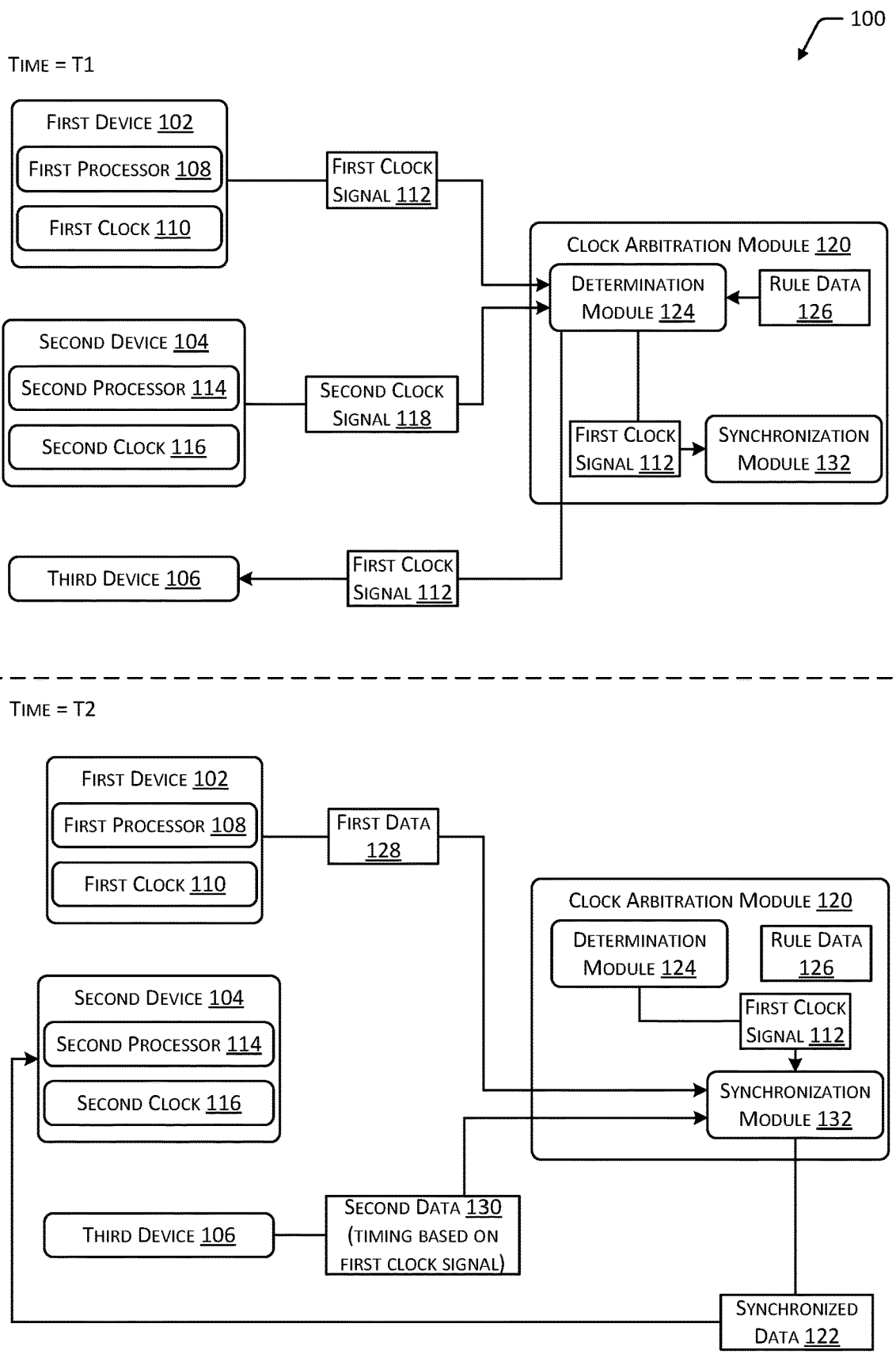
FIG. 1 is a diagram depicting an implementation of a system for synchronizing data when multiple devices, or multiple components of the same device, send clock signals using different device clocks.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

A computing device may include a device clock that is usable to synchronize operation of its components, and to synchronize operations of the computing device with operations of other computing devices. Synchronized data may be used to perform various functions. As one example, a computing device may present audio output using one or more speakers. During presentation of the output, the computing device may receive audio input using one or more microphones. For example, audio input may include voice commands provided by a user to control the computing device, however the audio input acquired by the microphone(s) may include additional sounds, such as the audio output that is presented concurrently while the user provides voice input. The noise associated with the audio output that is received by the microphones may prevent processing of the voice input. An acoustic echo cancellation (AEC) algorithm may be performed in which the known audio output presented by the computing device is used to identify the portion within the audio input that is associated with the presented output, which may enable the portion of the audio input that is associated with voice commands from the user to be identified and processed. Use of an AEC algorithm typically requires that data from an audio output device be synchronized with data from an audio input device. For example, frames of audio output and audio input that are associated with the same instant in time may be used to identify portions of the audio input that are not caused by the audio output, while unsynchronized frames of output and input may not be usable for this purpose. To enable synchronization of data in this manner, both the audio output device and audio input device may be provided with signals from a single device clock, which may enable data from both devices to be associated with a common timing.

In some cases, multiple devices, or multiple components of the same device, may be associated with different device clocks, and different devices or device components may not necessarily be configured to accept external clock signals from other device clocks. For example, certain types of televisions, networked speaker devices, or other types of media devices may include an audio output device associated with a first device clock that generates a clock signal when the device is presenting audio output, and a coprocessor associated with a second device clock that is active to process voice inputs from a user even at times when the device is not presenting audio output. In cases where a device, or a system of devices, includes multiple device clocks, and one or more devices or device components are not able to be configured using external clock signals, synchronization of data may present a considerable issue. For example, if the data is not synchronized, subsequent operations such as performance of an AEC algorithm may fail.

Described in this disclosure are techniques for synchronizing data when multiple devices, or multiple components of the same device, use different device clocks that may be available or unavailable at different times. For example, a first device may include a first processor and a first clock. The first clock generates a first clock signal during operation of the first device. Continuing the example, the first device may include a television, audio device, or other type of media device, and the first clock may generate the first clock signal when the device is active (e.g., presenting content), but may not generate the first clock signal when the device is not active. A second device may include a second processor and a second clock. The second clock generates a second clock signal during operation of the second device. For example, the second device may include a coprocessor that is used to process audio input received by a microphone array. Continuing the example, the coprocessor may remain active, even when the first device is not active, to enable the device(s) to receive voice input from a user. A third device may be synchronized using clock signals from one of the first device or the second device. For example, the third device may include an audio input device, such as an analog to digital converter (ADC) that processes output from a microphone array. The third device may lack a device clock or may be configured to accept external clock signals from other devices. Therefore, when the third device receives a clock signal from one of the first device or the second device, data sent from the third device to other device(s) may be synchronized based on the received clock signal.

When the first device is active, a first clock signal from the first device and a second clock signal from the second device may both be received. In some implementations, the system may access rule data, which may indicate priorities, hierarchies, or other types of determinations, which may indicate that when a first clock signal is received from the first device, the first clock signal is to be sent to the third device for use. In other implementations, circuitry may include logic or may otherwise be configured to send the clock signal from the first device to the third device when a clock signal from the first device is present. Therefore, in response to receipt of the first clock signal, the second clock signal may be disregarded and the first clock signal may be sent to the third device. Data from the third device that is synchronized based on the first clock signal may then be received. This data may be sent to the second device, or may be synchronized based on additional data from the first device.

For example, the first device may include a main logic board of a television or other type of media device. When the television is active, first data (such as an audio output) may be determined from the first device in addition to the first clock signal from the first clock associated with the first device. Because the television is presenting audio output, synchronization of audio input using the device clock of the television may be used to enable performance of an AEC algorithm or other type of processing. Therefore, a second clock signal from the second device may be disregarded when the first clock signal is received from the first device. Providing the first clock signal to the third device may enable the third device to send data to other devices based on a timing associated with the first clock. For example, voice inputs provided to a microphone may be associated with the timing of the first clock of the television. This common timing between the voice inputs of the microphone and the audio output of the television may enable synchronized data to be generated that associates frames of audio output and voice input that occurred at the same times with one another. The synchronized data may be provided to the coprocessor, which may use an AEC algorithm or other type of processing to enable the voice inputs to be identified and processed.

When the first device is not active, a first clock signal from the first device may not be received, while the second clock signal from the second device is received. As a result, during times when the first device is not active, in response to an absence of the first clock signal, the second clock signal may be provided to the third device. The third device may then generate data that is synchronized based on the second clock signal. Synchronized data based on the data from the third device may then be sent to the second device for processing. As a result, the third device may be provided with a clock signal independent of whether the first device is in an active state. For example, if a main logic board television or other type of media device is inactive, a coprocessor of the television may remain active to receive voice input and may provide a clock signal, even at times when the television is inactive. Providing the clock signal from the coprocessor to the ADC or other device associated with the microphone(s) may enable voice inputs to be synchronized with the device clock timing of the audio processor at times when the television is not active.

The clock signal provided to the third device may be changed when the active status of the first device changes. For example, if the first device transitions from an active state to an inactive state, the first clock of the first device may cease providing the first clock signal, and the second clock signal from the second device may be provided to the third device. If the first device transitions from an inactive state to an active state, the first clock of the first device may begin providing the first clock signal. In such a case, in response to receipt of the first clock signal, the first clock signal may be provided to the third device.

Techniques described herein may therefore enable an ADC or other type of device to be provided with a clock signal for operation and synchronization purposes, independent of the active state of a television or other type of device. Additionally, while implementations presented herein describe two devices having device clocks, in other implementations, any number of devices that generate clock signals may be present, and rule data, logic, or circuitry may be present to select a particular clock signal to provide to a device based on the clock signals that are received.

FIG. 1 is a diagram 100 depicting an implementation of a system for synchronizing data when multiple devices, or multiple components of the same device, send clock signals using different device clocks. The depicted system includes a first device 102, a second device 104, and a third device 106. In some cases, one or more of the devices may include a computing device having a processor, memory, and so forth. In other cases, one or more devices may include other types of circuitry to perform the functions described herein. Additionally, while FIGS. 1-4 depict three devices as separate elements, in some implementations, the depicted devices may include multiple components of the same device or system. For example, the first device 102, second device 104, and third device 106 may be physically connected, such as in physical wired communication, as part of a device or system. Further, while FIGS. 1-4 depict three example devices, the techniques described herein may be used with regard to systems that include any number of devices having any number of device clocks.

As one example implementation, the first device 102, second device 104, and third device 106 may be part of a television or other type of media device. For example, the first device 102 may include one or more components of a television, such as a main logic board, that acquire and present output, such as audio output and video output. The second device 104 may include a coprocessor that may be used to process audio data from the first device 102 and the third device 106, such as for performance of an AEC algorithm to identify and process voice inputs. The third device 106 may include one or more components of the television that acquire and process input, such as a microphone array, ADC, and so forth.

As shown in FIG. 1, the first device 102 may include a first processor 108, or other circuitry, and a first clock 110. The first processor 108 may be used to perform various functions, such as acquisition and presentation of output or other data, receipt of commands or instructions from other devices, and so forth. The first clock 110 may be used to generate a first clock signal 112 that may be used to synchronize operations of components of the first device 102 and to synchronize operations of the first device 102 with those of other devices. In some implementations, the first device 102 may be unable to accept external clock signals from other devices. For example, the first device 102 may not be configured to synchronize data based on clock signals from other devices.

The second device 104 may include a second processor 114, or other circuitry, and a second clock 116. The second processor 114 may be used to perform various functions, such as receiving and processing data from other devices, performance of an AEC algorithm, processing of inputs or other data, and so forth. The second clock 116 may be used to generate a second clock signal 118 that may be used to synchronize operations of components of the second device 104 and to synchronize operations of the second device 104 with those of other devices. In some implementations, the second device 104 may be unable to accept external clock signals from other devices. For example, the second device 104 may not be configured to synchronize data based on clock signals from other devices.

The third device 106 may include one or more processors or other circuitry, and may be configured to accept external clock signals from other devices for synchronization of data. For example, the third device 106 may function to receive input from a user, generate output, or otherwise provide data to other components of the system, and the data provided by the third device 106 may be synchronized based on a clock signal received from another device.

The system may include a clock arbitration module 120, which may include circuitry or computer-executable instructions associated with one or more of the first device 102, second device 104, third device 106, or another device within the system. In some implementations, the clock arbitration module 120 may be associated with hardware such as an application specific integrated circuit, a field programmable gate array (FPGA), a microcontroller, and so forth. The clock arbitration module 120 may receive clock signals from one or more of the first device 102 or the second device 104, and may provide a selected clock signal to the third device 106 for synchronization of data. The clock arbitration module 120 may receive data from the third device 106, and in some implementations the first device 102, and may generate synchronized data 122 for use by the second device 104.

As shown in FIG. 1, at a first time T1, the first device 102 may be in an active state. For example, at the first time T1, the first device 102 may present output, such as audio output, and the first clock 110 of the first device 102 may provide the first clock signal 112 to the clock arbitration module 120. The second clock 116 of the second device 104 may provide the second clock signal 118 to the clock arbitration module 120 independent of the active or inactive state of the first device 102. For example, the second device 104 may function to receive voice input or other types of input from a user during times when the first device 102 is inactive, as well as during times when the first device 102 is in an active state. A determination module 124 associated with the clock arbitration module 120 may receive the first clock signal 112 and the second clock signal 118 and determine a particular clock signal to be used to synchronize data from the third device 106. In some implementations, the determination module 124 may access rule data 126, which may indicate a priority, hierarchy, or other indication that prioritizes the first clock signal 112 over the second clock signal 118. For example, during times when the first device 102 is in an active state, synchronizing data from the third device 106, such as voice inputs from a user, with data from the first device 102 such as audio output, using the first clock signal 112 may be prioritized, and the determination module 124 may disregard the second clock signal 118. However, during times when the first device 102 is not in an active state, the second clock signal 118 may be used to synchronize data from the third device 106 with the second clock 116 of the second device 104.

Therefore, at the first time T1, the clock arbitration module 120 may determine receipt of the first clock signal 112, and in response to receipt of the first clock signal 112, may provide the first clock signal 112 to the third device 106. At a second time T2, after providing the first clock signal to the third device 106 the clock arbitration module 120 may determine first data 128 from the first device 102, in addition to the first clock signal 112. The clock arbitration module 120 may also determine second data 130 from the third device 106. For example, the first data 128 may include audio output presented by the first device 102 while the second data 130 includes audio input received by the third device 106. In other implementations, the first device 102 may not necessarily generate or provide first data 128 to the clock arbitration module 120, and the second data 130 may be received from the third device 106 independent of the first device 102.

A synchronization module 132 associated with the clock arbitration module 120 may generate synchronized data 122 based on the first data 128 if present, the second data 130, and the first clock signal 112. For example, the synchronized data 122 may associate frames of audio output or other data from the first device 102, with corresponding frames of audio input or other data from the third device 106, that are associated with the same instant in time. The synchronized data 122 may then be provided to the second device 104. As described previously, in some implementations, the second device 104 may perform an AEC algorithm or other type of process based on the time synchronization of the data received from the third device 106, and in some cases from the first device 102.

Figure 2:
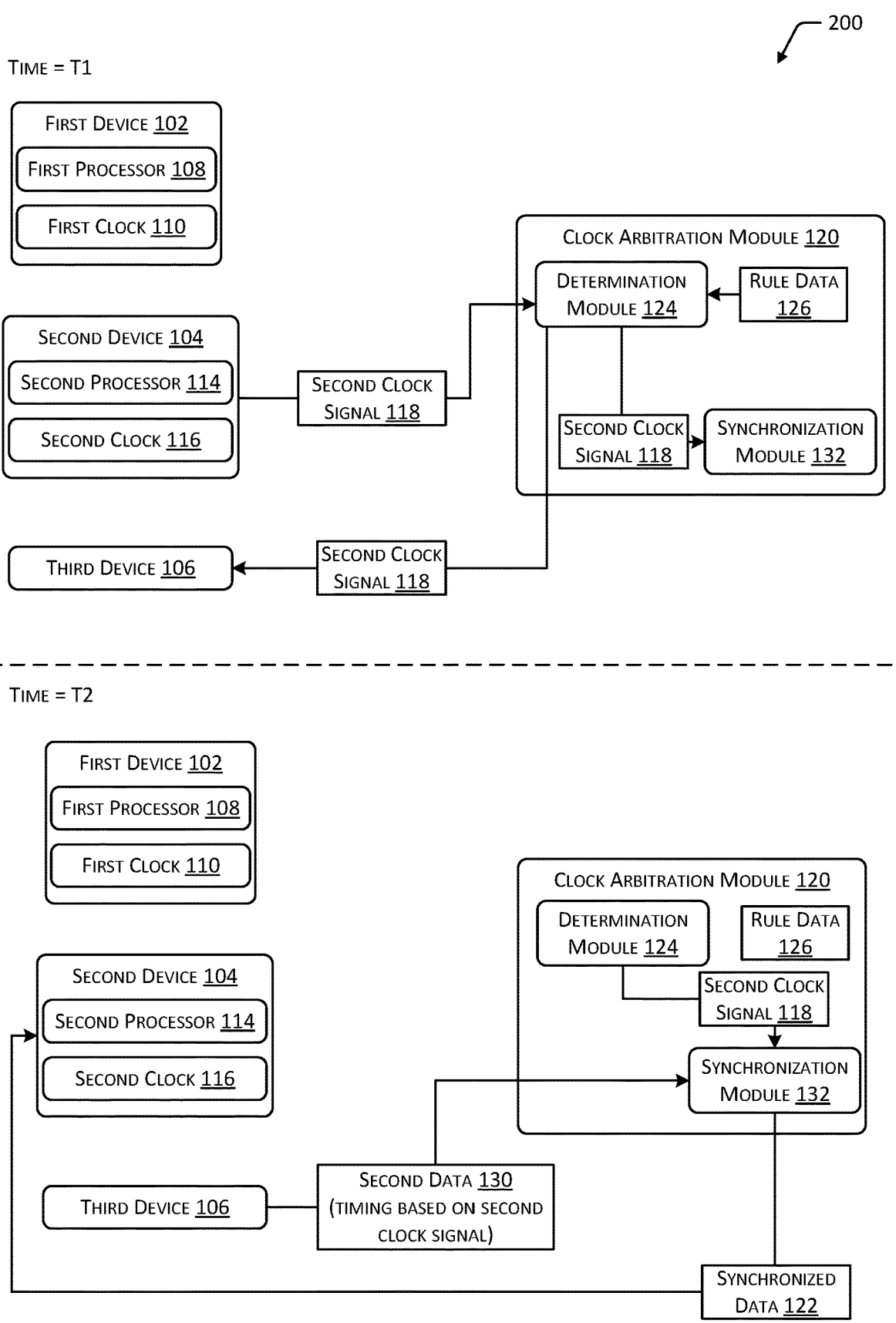
FIG. 2 is a diagram depicting the system of FIG. 1 when a single device, or component of a device, sends a clock signal while one or more other devices or components are in an inactive state.

FIG. 2 is a diagram 200 depicting the system of FIG. 1 when a single device, or component of a device, sends a clock signal while one or more other devices or components are in an inactive state. In some cases, the first device 102 may be in an inactive state. For example, a television or other media device may be in an inactive state when not presenting output. In such a case, the second device 104 may provide the second clock signal 118 to the clock arbitration module 120 independent of the active or inactive state of the first device 102. For example, the second device 104 may include a coprocessor that functions to process audio input provided to control one or more of the devices independent of the active state of the first device 102. Therefore, as shown in FIG. 2, at a first time T1, the determination module 124 associated with the clock arbitration module 120 may receive the second clock signal 118 and may determine an absence of the first clock signal 112 from the first device 102. In response to the absence of the first clock signal 112, the determination module 124 may provide the second clock signal 118 to the third device 106 to enable the third device 106 to synchronize data based on the second clock 116 of the second device 104.

At a second time T2, the third device 106 may provide second data 130 to the clock arbitration module 120 that may be synchronized based on the second clock signal 118 received from the second device 104. The synchronization module 132 may generate synchronized data 122 based on the second data 130 and the second clock signal 118. The synchronized data 122 may be provided to the second device 104 for performance of an AEC algorithm or other type of processing.

The system shown in FIG. 1 and FIG. 2 may transition between the states shown in FIG. 1 and FIG. 2 as the active status of the first device 102 changes. For example, when the first device 102 is active, as shown in FIG. 1, data from the third device 106 may be synchronized based on the first clock signal 112. If the first device 102 becomes inactive, then as shown in FIG. 2, the second clock signal 118 may be provided to the third device 106 and data from the third device 106 may be synchronized based on the second clock signal 118. If the first device 102 again becomes active, then as shown in FIG. 1, in response to receipt of the first clock signal 112, the clock arbitration module 120 may provide the first clock signal 112 to the third device 106 to enable data from the third device 106 to be synchronized based on the first clock signal 112.

Figure 3:
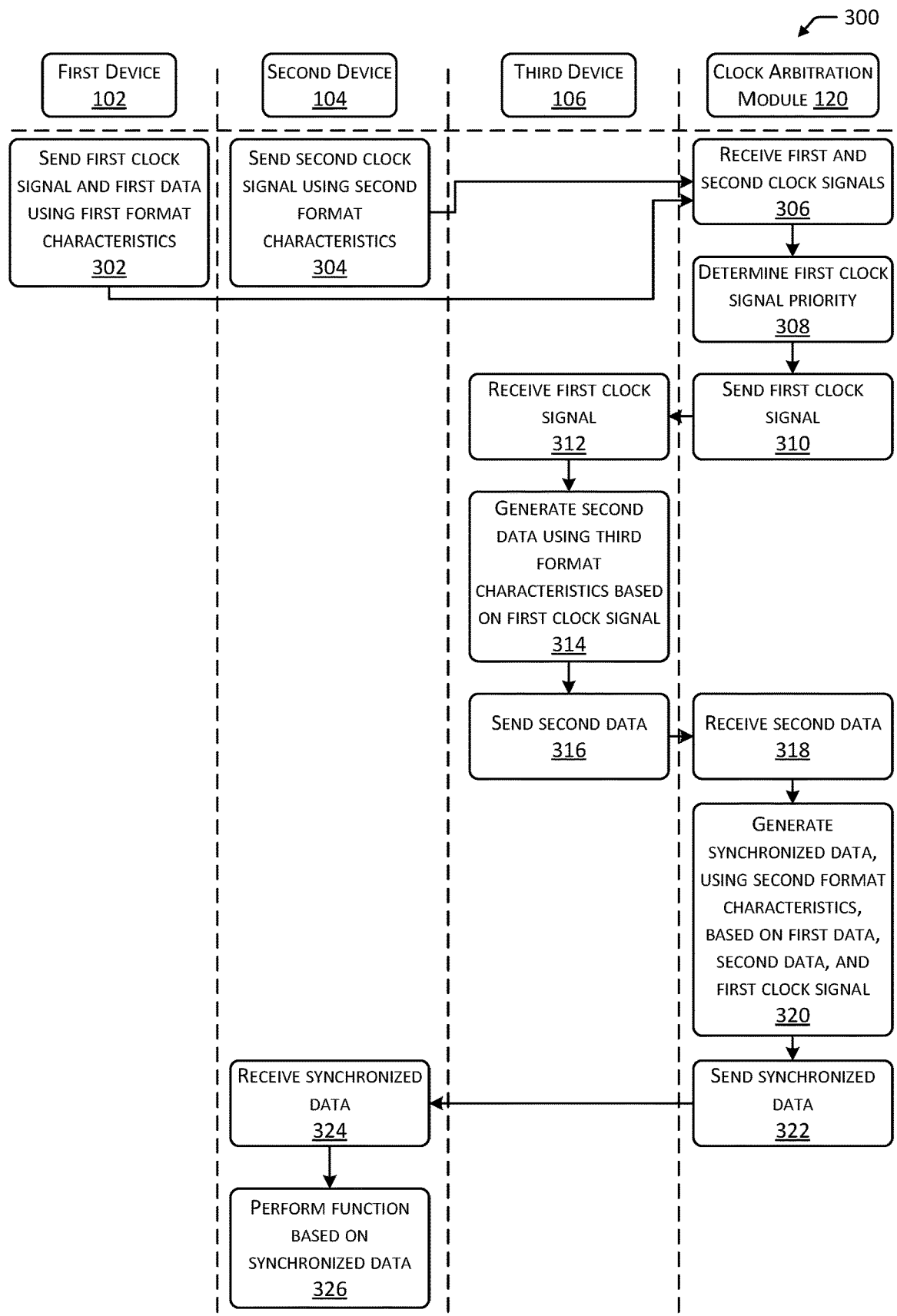
FIG. 3 is a flow diagram depicting an implementation of a method for synchronizing data when multiple devices, or multiple components of the same device, as shown in FIG. 1, send clock signals using different device clocks.

FIG. 3 is a flow diagram 300 depicting an implementation of a method for synchronizing data when multiple devices, or multiple components of the same device, as shown in FIG. 1, send clock signals using different device clocks. At 302, a first device 102 may send a first clock signal 112 and first data 128 to a clock arbitration module 120 with first format characteristics. The first clock signal 112 may be based on a first clock 110 associated with the first device 102. The first data 128 may include any type of data generated, determined, or sent by the first device 102. For example, the first data 128 may include an audio output associated with the first device 102. As described with regard to FIGS. 1-2, the clock arbitration module 120 may be associated with one or more of the first device 102, second device 104, third device 106, or a separate computing device. Additionally, the clock arbitration module 120 may be associated with computer-executable instructions executed by a processor, other types of circuitry, or combinations thereof. For example, the clock arbitration module 120 may be associated with hardware such as an application specific integrated circuit, a field programmable gate array (FPGA), a microcontroller, and so forth. Data provided by the first device 102 may be associated with first format characteristics. For example, the first data 128 provided by the first device 102 may include audio data having a Time Division Multiplexing (TDM), Inter-integrated Circuit (I2C), or Serial Peripheral Interface (SPI) format, a selected number of channels having a selected frequency, and so forth. In some cases, the first clock signal 112 may also be associated with one or more format characteristics.

At 304, a second device 104 may send a second clock signal 118 to the clock arbitration module 120. The second clock signal 118 may be associated with a second clock 116 of the second device 104. As described with regard to FIGS. 1-2, in some implementations, the first device 102 and second device 104 may be unable to accept external clock signals from other devices. In some cases, the second clock signal 118 may be associated with one or more second format characteristics that may differ from the first format characteristics. For example, the first device 102 may send data having a TDM format and a select set of channels while the second device 104 is configured to receive data associated with an SPI bus protocol and using a different number of channels.

At 306, the clock arbitration module 120 may receive the first clock signal 112 and second clock signal 118. At 308, the clock arbitration module 120 may determine a priority associated with the first clock signal 112. For example, a device or system of devices may be configured such that when a first clock signal 112 is received, the first clock signal 112 is used to synchronize data from other devices independent of other clock signals that are received. In one implementation, the clock arbitration module 120 may access rule data 126 that indicates a priority or hierarchy associated with one or more clock signals. At 310, in response to the determined priority associated with the first clock signal 112, the clock arbitration module 120 may send the first clock signal 112 to the third device 106.

At 312, the third device 106 may receive the first clock signal 112. At 314, the third device 106 may generate second data 130 based on the first clock signal 112. For example, data generated by the third device 106 may be synchronized based on the first clock 110 of the first device 102 based on the first clock signal 112. The second data 130 may be associated with third format characteristics. For example, the second data 130 may include audio input data received using one or more microphones and may have a TDM format or other type of format, be associated with a selected number of channels having selected frequencies, and so forth. At 316, the third device 106 may send the second data 130 to the clock arbitration module 120.

At 318, the clock arbitration module 120 may receive the second data 130. At 320, the clock arbitration module 120 may generate synchronized data 122 based on the first data 128, second data 130, and first clock signal 112. For example, the synchronized data 122 may associate portions of the first data 128 and second data 130 that are associated with the same instant in time with one another, based on the first clock 110 of the first device 102, which may enable the second device 104 to perform one or more functions on the synchronized data 122, such as an AEC algorithm. The synchronized data 122 may be generated based on the second format characteristics of the second device 104. For example, the first device 102 and third device 106 may provide data to the clock arbitration module 120 having formats that differ from those associated with the second device 104. The clock arbitration module 120 may generate synchronized data 122 having one or more formats usable by the second device 104. For example, the first device 102 and third device 106 may provide audio data having a TDM format, while the second device 104 may include an audio processor that receives the synchronized data 122 using an SPI bus protocol. At 322, the clock arbitration module 120 may send the synchronized data 122 to the second device 104.

At 324, the second device 104 may receive the synchronized data 122. At 326, the second device 104 may perform a function based on the synchronized data 122. In some implementations, the function may include an AEC algorithm. For example, the first data 128 from the first device 102 may include audio data that is output by the first device 102 during operation, and the second data 130 from the third device 106 may include audio input received from an ADC associated with one or more microphones, such as voice input from a user. An AEC algorithm may be used to determine a first portion of the synchronized data 122 associated with the first data 128 and a second portion of the synchronized data 122 associated with the second data 130, which may enable voice inputs or other data from the third device 106 to be processed while disregarding noise created by the first device 102. The second device 104 may determine a voice input or other portion of the synchronized data 122 and perform one or more actions, or in other implementations, the second device 104 may provide the determined voice input or other portion of the synchronized data 122, or other data indicative of this determination, to another device for performance of one or more functions.

Figure 4:
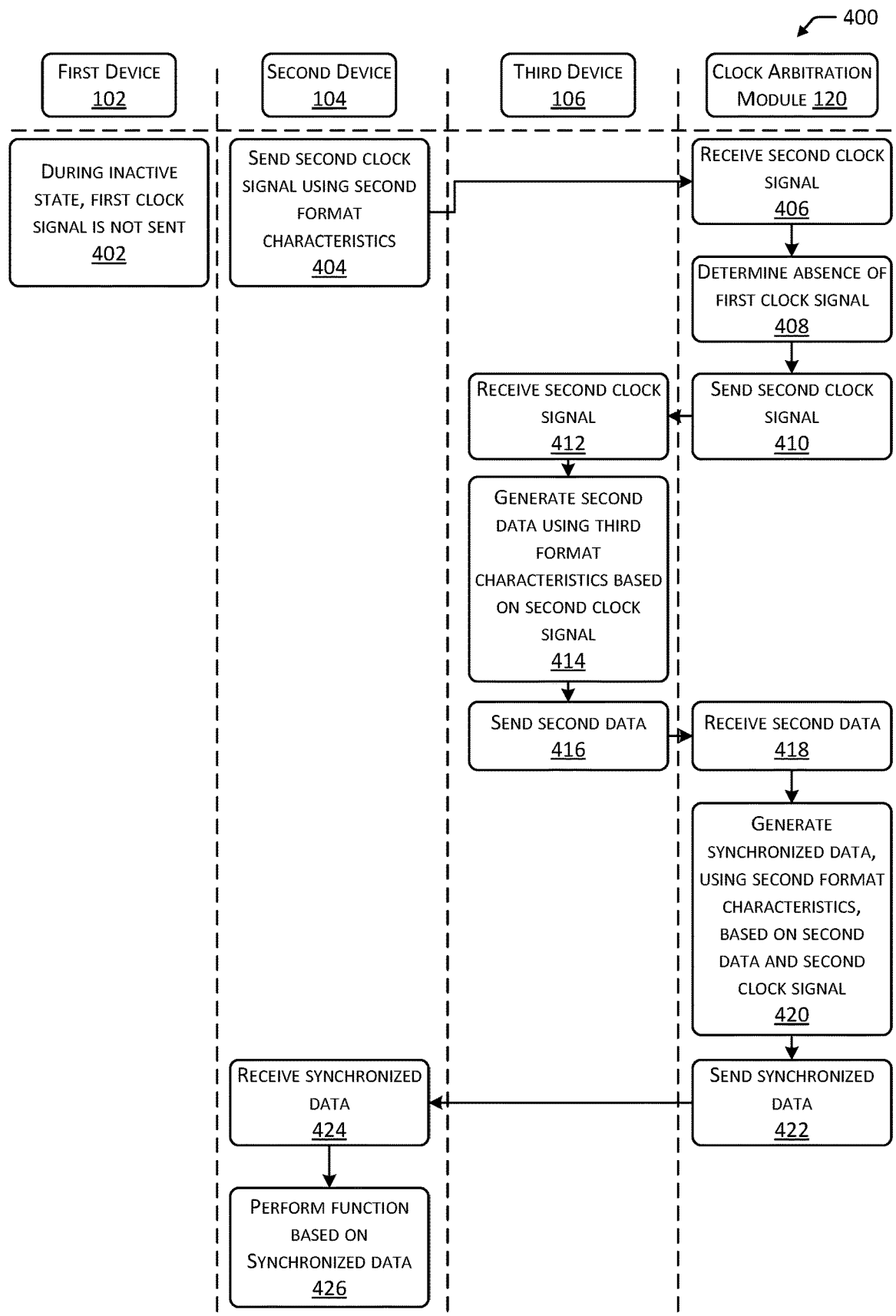
FIG. 4 is a flow diagram depicting an implementation of a method for synchronizing data when a single device, or component of a device, as shown in FIG. 2, sends a clock signal while one or more other devices or components are in an inactive state.

FIG. 4 is a flow diagram 400 depicting an implementation of a method for synchronizing data when a single device, or component of a device, as shown in FIG. 2, sends a clock signal while one or more other devices or components are in an inactive state. In some cases, the first device 102 may be in an inactive state. In such a case, as shown at 402, the first clock signal 112 may not be sent from the first device 102 to the clock arbitration module 120. In other implementations, data from the first device 102 may be received, but the data may indicate the inactive state of the first device 102, and the clock arbitration module 120 may determine a lack of priority associated with the data from the first device 102 based on the inactive state.

At 404, the second device 104 may send the second clock signal 118 to the clock arbitration module 120. As described with regard to FIG. 3, in some implementations, the second clock signal 118 may be associated with, may include, or may indicate format characteristics that are associated with the second device 104. The second device 104 may be configured to send the second clock signal 118 independent of the active state of the first device 102, such that at least one clock signal is received by the clock arbitration module 120 and provided to the third device 106. For example, the second device 104 may include a coprocessor that remains active to receive user input, such a voice commands, independent of the active or inactive states of other devices or components of devices.

At 406, the clock arbitration module 120 may receive the second clock signal 118 from the second device 104. At 408, the clock arbitration module 120 may determine an absence of the first clock signal 112. In some implementations, the clock arbitration module 120 may access rule data 126 that indicates use of the second clock signal 118 in the absence of the first clock signal 112. At 410, based on the absence of the first clock signal 112, the clock arbitration module 120 may send the second clock signal 118 to the third device 106.

At 412, the third device 106 may receive the second clock signal 118. At 414, the third device 106 may generate second data 130 based on the second clock signal 118. For example, the second data 130 may be synchronized based on the second clock 116 of the second device 104 using the second clock signal 118. In some implementations, the second data 130 may be associated with format characteristics that are associated with the third device 106. For example, the third device 106 may include an ADC associated with one or more microphones, and the second data 130 may have a TDM format or other type of format, may be associated with a selected number of channels having selected frequencies, and so forth. At 416, the third device 106 may send the second data 130 to the clock arbitration module 120.

At 418, the clock arbitration module 120 may receive the second data 130. At 420, the clock arbitration module 120 may generate synchronized data 122 based on the second data 130 and the second clock signal 118. For example, the synchronized data 122 may associate portions of the second data 130 with a particular timing associated with the second clock 116 of the second device 104. The synchronized data 122 may be generated based on the second format characteristics of the second device 104. For example, the third device 106 may provide audio data having a TDM format, while the second device 104 may include a coprocessor that receives the synchronized data 122 using an SPI bus protocol. At 422, the clock arbitration module 120 may send the synchronized data 122 to the second device 104.

At 424, the second device 104 may receive the synchronized data 122. At 426, the second device 104 may perform a function based on the synchronized data 122. In some implementations, the function may include use of an AEC algorithm or other type of processing to determine a particular portion of the synchronized data 122 that includes selected content. In other cases, the function may include determination of, and particular inputs present in, the synchronized data 122 and performance of one or more actions based on the determined inputs. In other implementations, inputs determined by the second device 104, or data indicative of the inputs, may be provided to one or more other devices for performance of one or more functions based on the determined inputs.

As described previously, techniques used herein may enable a system to transition between the processes shown in FIG. 3 and FIG. 4 as the active status of the first device 102 changes. For example, the process depicted in FIG. 3 may be performed when the first device 102 is in an active state, and if the first device 102 becomes inactive and the first clock signal 112 is no longer received, the process shown in FIG. 4 may be performed and the second clock signal 118 may be provided to the third device 106. If the first device 102 returns to an active state and the first clock signal 112 is received, the process depicted in FIG. 3 may again be performed. Therefore, while FIG. 4 is presented after FIG. 3, a system may initially perform either of the processes shown in FIGS. 3 and 4 based on the active state of the first device 102, and may transition to either of the depicted processes as the active state of the first device 102 and the corresponding receipt or absence of the first clock signal 112 changes.

Figure 5:
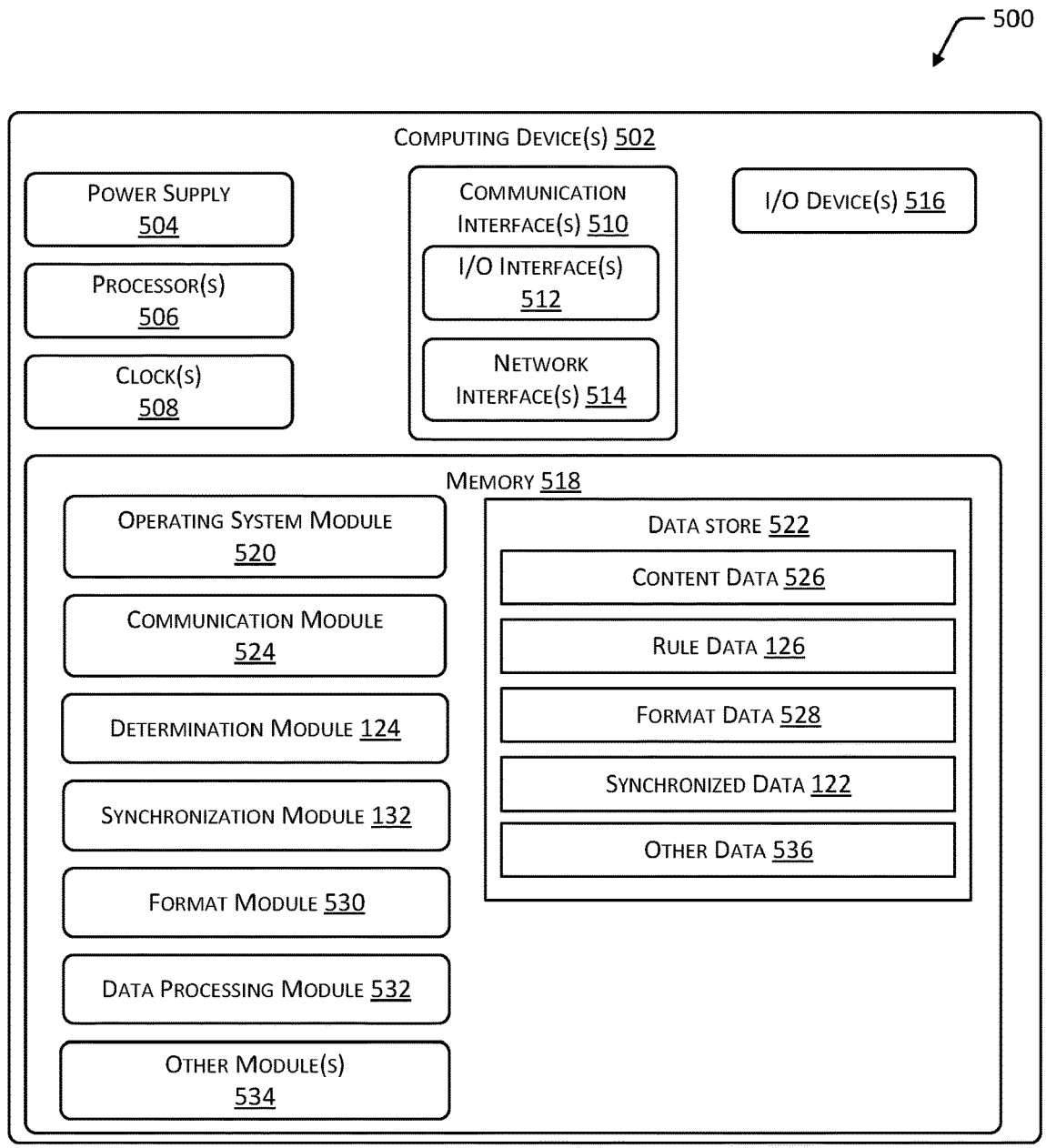
FIG. 5 is a block diagram depicting an implementation of a computing device within the present disclosure.

FIG. 5 is a block diagram 500 depicting an implementation of a computing device 502 within the present disclosure. The illustrative computing device 502 shown in FIG. 5 may include the first device 102, the second device 104, the third device 106, or combinations thereof. For example, any of the functions described herein may be performed by any of the described devices. Continuing the example, in some cases, one or more of the first device 102, the second device 104, or the third device 106 may be components within a single device or system of devices. In other cases, the illustrative computing device 502 may include one or more additional computing devices in addition to or in place of performance of one or more functions described herein by the first device 102, the second device 104, or the third device 106. For example, a separate computing device 502 may be used to perform the functions associated with the clock arbitration module 120. Additionally, while FIG. 5 depicts a computing device 502 having one or more processors, memories, and so forth, in other implementations, the functions described herein may be implemented in hardware, firmware, as a system on a chip (SoC), or using one or more other types of circuitry. For example, the clock arbitration module 120 may be associated with hardware such as an application specific integrated circuit, a field programmable gate array (FPGA), a microcontroller, and so forth. As such, while FIG. 5 depicts a single illustrative block diagram 500, any number and any type of computing devices 502 or other types of circuitry or devices may be used to perform the functions described herein.

One or more power supplies 504 may be configured to provide electrical power suitable for operating the components of the computing device 502. In some implementations, the power supply 504 may include a rechargeable battery, fuel cell, photovoltaic cell, power conditioning circuitry, and so forth.

The computing device 502 may include one or more hardware processor(s) 506 (processors) configured to execute one or more stored instructions. The processor(s) 506 may include one or more cores. For example, the depicted processor(s) 506 may include the first processor 108 or second processor 114 shown in FIGS. 1 and 2, a separate processor associated with the third device 106, a separate processor associated with one or more other devices such as a computing device 502 associated with the clock arbitration module 120, and so forth. One or more clock(s) 508 may provide information indicative of date, time, ticks, and so forth. For example, the processor(s) 506 may use data from a clock 508 to generate a timestamp, trigger a preprogrammed action, and so forth. As described with regard to FIGS. 1-4, the clock(s) 508 may include the first clock 110 or the second clock 116. For example, the first clock 110 and second clock 116 may be used to synchronize data received from one or more of the first device 102, second device 104, or third device 106. Additionally, in some cases, one or more other clocks 508 associated with the third device 106 or one or more other computing devices 502 may be used to trigger actions, generate timestamps, and so forth.

The computing device 502 may include one or more communication interfaces 510, such as input/output (I/O) interfaces 512, network interfaces 514, and so forth. The communication interfaces 510 may enable the computing device 502, or components of the computing device 502, to communicate with other computing devices 502 or components of the other computing devices 502. The I/O interfaces 512 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 512 may couple to one or more I/O devices 516. The I/O devices 516 may include any manner of input devices or output devices associated with the computing device 502. For example, I/O devices 516 may include touch sensors, displays, touch sensors integrated with displays (e.g., touchscreen displays), keyboards, mouse devices, microphones, image sensors, cameras, scanners, speakers or other types of audio output devices, haptic devices, printers, and so forth. In some implementations, the I/O devices 516 may be physically incorporated with the computing device 502. In other implementations, the I/O devices 516 may be externally placed. For example, as described with regard to FIGS. 1-4, in some implementations, the first device 102 may include one or more speakers that present audio output, while the third device 106 may include one or more microphones that receive audio input, such as voice commands or other types of input from a user.

The network interfaces 514 may be configured to provide communications between the computing device 502 and other devices, such as the I/O devices 516, routers, access points, and so forth. The network interfaces 514 may include devices configured to couple to one or more networks including local area networks (LANs), wireless LANs (WLANs), wide area networks (WANs), wireless WANs, and so forth. For example, the network interfaces 514 may include devices compatible with Ethernet, Wi-Fi, Bluetooth, ZigBee, Z-Wave, 4G, 5G, LTE, and so forth.

The computing device 502 may include one or more buses or other internal communications hardware or software that allows for the transfer of data between the various modules and components of the computing device 502. For example, the second device 104 may be configured to receive data via an SPI bus.

As shown in FIG. 5, the computing device 502 may include one or more memories 518. The memory 518 may include one or more computer-readable storage media (CRSM). The CRSM may be any one or more of an electronic storage medium, a magnetic storage medium, an optical storage medium, a quantum storage medium, a mechanical computer storage medium, and so forth. The memory 518 may provide storage of computer-readable instructions, data structures, program modules, and other data for the operation of the computing device 502. A few example modules are shown stored in the memory 518, although the same functionality may alternatively be implemented in hardware, firmware, a system on a chip (SoC), or one or more other types of circuitry.

The memory 518 may include one or more operating system (OS) modules 520. The OS module 520 may be configured to manage hardware resource devices such as the I/O interfaces 512, the network interfaces 514, the I/O devices 516, and to provide various services to applications or modules executing on the processors 506. The OS module 520 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Washington, USA; or other operating systems.

One or more data stores 522 and one or more of the following modules may also be associated with the memory 518. The modules may be executed as foreground applications, background tasks, daemons, and so forth. The data store(s) 522 may use a flat file, database, linked list, tree, executable code, script, or other data structure to store information. In some implementations, the data store(s) 522 or a portion of the data store(s) 522 may be distributed across one or more other devices including other computing devices 502, network attached storage devices, and so forth.

A communication module 524 may be configured to establish communications with one or more other computing devices 502. Communications may be authenticated, encrypted, and so forth.

The memory 518 may also store the determination module 124. The determination module 124 may receive clock signals from one or more devices, or components of a device, and determine a particular clock signal to be used to synchronize data from one or more other devices, or components of devices. In some implementations, the determination module 124 may access rule data 126, which may indicate a priority, hierarchy, or other indication that prioritizes one or more clock signals over one or more other clock signals.

The memory 518 may additionally store the synchronization module 132. The synchronization module 132 may generate synchronized data 122 from content data 526 that is received from one or more other devices, or components of devices, and based on a clock signal received from one or more devices, or components of devices. Content data 526 may include one or more of the first data 128 or second data 130, described with regard to FIGS. 1-4. Content data 526 may also include other types of data associated with output by or input to one or more devices, data received or processed by one or more devices, data stored in association with one or more devices, and so forth. For example, synchronized data 122 may associate frames of data, such as audio, video, or other types of content, from one or more devices, with times determined based on a selected clock signal. Continuing the example, synchronized data 122 may include frames of audio output and frames of audio input from different devices, or components of devices, that may be used to perform an AEC algorithm to determine portions of the audio input that were caused by the audio output. In some implementations, the synchronized data 122 may be provided with one or more format characteristics indicated in format data 528. For example, the memory 518 may store a format module 530 that may determine format characteristics associated with received or stored data, and may convert the received or stored data to another format, generate data having a selected format based on the received or stored data, and so forth. For example, the computing device 502 may receive data from a first device 102 having first format characteristics and may generate synchronized data 122 to be sent to a second device 104 having second format characteristics suitable for use by the second device 104.

The memory 518 may also store a data processing module 532. The data processing module 532 may be used to perform various functions based on content data 526 and synchronized data 122. For example, the data processing module 532 may be used to perform preprocessing algorithms or functions based on received or stored content data 526 before generation of synchronized data 122. As another example, the data processing module 532 may be used to perform processing of synchronized data 122, such as to determine particular portions of the synchronized data 122 associated with particular times, types of data, data having particular characteristics, and so forth. In some cases, the data processing module 532 may be used to perform one or more functions based on the synchronized data 122, such as a function based on an input included in the synchronized data 122.

Other modules 534 may also be present in the memory 518. For example, other modules 534 may include permission or authorization modules to enable users to access and modify data associated with the computing device 502, such as rule data 126, format data 528, and so forth. Permission or authorization modules may also acquire authorization for the acquisition of content data 526, such as audio data or video data, user input, and so forth. Other modules 534 may also include encryption modules to encrypt and decrypt communications between computing devices 502, authentication modules to authenticate communications sent or received by computing devices 502, and so forth.

Other data 536 within the data store(s) 522 may include configurations, settings, preferences, and default values associated with computing devices 502. Other data 536 may also include encryption keys and schema, access credentials, and so forth. Other data 536 may further include algorithms, functions, threshold data, and so forth used for data processing, analysis, and performance of functions based on data.

In different implementations, different computing devices 502 may have different capabilities or capacities. For example, servers that store or access one or more of the described modules may have greater processing capabilities or data storage capacity than media devices or personal computing devices used to acquire, receive, send, or process content data 526 and clock signals.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
 a first device comprising a first processor and a first clock, wherein the first clock generates a first clock signal during operation;
 a second device comprising a second processor and a second clock, wherein the second clock generates a second clock signal during operation; and
 circuitry to:
  at a first time, receive first data and the first clock signal from the first device;
  at the first time, receive the second clock signal from the second device;
  in response to receipt of the first clock signal from the first device, send, to a third device, the first clock signal;
  receive second data from the third device, wherein the second data is associated with the first clock based on the first clock signal;

generate first synchronized data based on the first data, the second data, and the first clock signal, wherein the first synchronized data is synchronized based on the first clock; and send at least a portion of the first synchronized data to the second device, wherein the second device performs a first function based on the at least a portion of the first synchronized data.

2. The system of claim 1, further comprising circuitry to:

at a second time, receive the second clock signal from the second device;

at the second time, determine an absence of the first clock signal from the first device;

based on the absence the first clock signal, send, to the third device, the second clock signal;

receive third data from the third device, wherein the third data is associated with the second clock based on the second clock signal;

generate second synchronized data based on the third data and the second clock signal, wherein the second synchronized data is synchronized based on the second clock; and send at least a portion of the second synchronized data to the second device, wherein the second device performs a second function based on the at least a portion of the second synchronized data.

3. The system of claim 1, further comprising circuitry to:

determine a first format associated with one or more of the first data or the first clock signal;

determine one or more of the first format or a second format associated with the second data;

determine a third format associated with the second device; and generate the first synchronized data based on the third format.

4. A system comprising:

a first device that includes a first clock that generates a first clock signal during operation;

a second device that includes a second clock that generates a second clock signal during operation;

a third device; and circuitry to:

at a first time, receive the second clock signal from the second device;

send the second clock signal to the third device;

receive first data from the third device, wherein the first data is associated with the second clock based on the second clock signal;

generate first synchronized data based on the first data and the second clock signal; and send at least a portion of the first synchronized data to the second device.

5. The system of claim 4, further comprising circuitry to:

determine an absence of the first clock signal based on the first clock, wherein the second clock signal is sent to the third device in response to the absence of the first clock signal.

6. The system of claim 4, further comprising circuitry to:

at a second time, receive the first clock signal from the first device;

at the second time, receive the second clock signal from the second device;

in response to receipt of the first clock signal from the first device, send the first clock signal to the third device;

receive second data from the third device, wherein the second data is associated with the first clock based on the first clock signal;

generate second synchronized data based on the second data and the first clock signal; and send at least a portion of the second synchronized data to the second device.

7. The system of claim 6, further comprising circuitry to:

at the second time, receive third data from the first device; and generate the second synchronized data further based on the third data.

8. The system of claim 7, wherein:

the second data includes audio input associated with an input device of the third device;

the third data includes audio output associated with an output device of the first device; and the second device is configured to determine a portion of the second synchronized data that includes the third data and perform a function based on the audio input.

9. The system of claim 6, wherein:

the first device is not configured to accept an external clock signal from the second device; and the second device is not configured to accept an external clock signal from the first device.

10. The system of claim 6, wherein:

the first device is in physical wired communication with the second device and the third device;

the second device is in physical wired communication with the first device and the third device; and the third device is in physical wired communication with the first device and the second device.

11. The system of claim 6, further comprising:

a fourth device that includes a third clock that generates a third clock signal during operation; and circuitry to:

at the second time, receive the third clock signal from the fourth device; and determine that the first clock signal is associated with a greater priority than the second clock signal and the third clock signal, wherein the first clock signal is sent to the third device based on the greater priority.

12. The system of claim 4, further comprising circuitry to:

determine a first format associated with the first data;

determine a second format associated with the second device; and generate the first synchronized data based on the second format.

13. A method comprising:

at a first time, receiving a first clock signal from a first device that includes a first clock and a second clock signal from a second device that includes a second clock;

generating a determination based on the first clock signal and the second clock signal and rule data;

sending the first clock signal to a third device based on the determination;

receiving, from the third device, first data based on the first clock signal;

generating first synchronized data based on the first data and the first clock signal; and sending at least a portion of the first synchronized data to the second device.

14. The method of claim 13, wherein:

the rule data prioritizes the first clock signal; and the first data from the third device is synchronized based on the first clock signal based on the rule data.

15. The method of claim 14, further comprising:

receiving second data from the first device; and generating the first synchronized data further based on the second data.

16. The method of claim 15, wherein:
the first data includes an audio input received using the third device; and
the second data includes an audio output associated with the first device; and
the method further comprising:
  using the second device to perform an acoustic echo cancellation algorithm on the first synchronized data to determine the audio input.

17. The method of claim 14, further comprising:
at a second time, receiving the second clock signal from the second device;
determining an absence of the first clock signal from the first device;
in response to the absence of the first clock signal, sending the second clock signal to the third device;
receiving second data from the third device, wherein the second data is associated with the second clock based on the second clock signal;
generating second synchronized data based on the second data and the second clock signal; and
sending at least a portion of the second synchronized data to the second device.

18. The method of claim 17, further comprising:
receiving the at least a portion of the second synchronized data at the second device; and
performing a function at the second device based on the at least a portion of the second synchronized data.

19. The method of claim 13, wherein:
the determination is indicative of a priority of the first clock signal; and
the first data from the third device is synchronized based on the first clock of the first device.

20. The method of claim 13, further comprising:
determining a first format associated with the first device;
determining a second format associated with the second device;
determining a third format associated with the third device; and
generating the first synchronized data using the second format.

* * * * *